United States Patent
Alber

[19]

[11] Patent Number: 6,164,398
[45] Date of Patent: Dec. 26, 2000

[54] TRANSPORTING DEVICE

[75] Inventor: Ulrich Alber, Albstadt, Germany

[73] Assignee: Alber Antriebstechnik GmbH, Albstadt, Germany

[21] Appl. No.: 09/152,903

[22] Filed: Sep. 14, 1998

[30]     Foreign Application Priority Data

Sep. 19, 1997 [DE] Germany ............................ 197 45 153

[51] Int. Cl.⁷ .................................................. B62B 5/02
[52] U.S. Cl. ............................. 180/8.2; 180/8.1; 180/8.3; 280/5.2; 280/5.3
[58] Field of Search ............................ 280/5.2, 5.3, 5.32, 280/5.26, 47.2, 47.17; 180/8.1, 8.2, 8.3, 8.5, 8.6

[56]              References Cited

U.S. PATENT DOCUMENTS 5,263,547  11/1993  Alber ......................................... 180/8.2

FOREIGN PATENT DOCUMENTS 196 14 319
   A1   10/1997   Germany .

*Primary Examiner*—Brian L. Johnson
*Assistant Examiner*—Rashmi Sharma
*Attorney, Agent, or Firm*—Michael J. Striker

[57]                ABSTRACT

A transporting device has a frame, wheels arranged on the frame, and a step climbing unit including an electric motor, first eccentric levers driven by the electric motor, second eccentric levers rotatably supported on the first eccentric levers supports on which the second eccentric levers are rotatably supported and which have lower ends provided with supporting elements, and a transmission provided between the first and second eccentric levers and having a transmission ratio 1:2.

8 Claims, 4 Drawing Sheets

TRANSPORTING DEVICE

BACKGROUND OF THE INVENTION

The present invention relates to a transporting device with wheels which are arranged on a frame and with an electric-motor driven stair climbing device.

Such a transporting device with a stair climbing device is disclosed for example in the German patent document DE 196 14 319.5 and has a particularly compact construction. The stair climbing device of this known transporting device has a support for supporting rollers which perform the required lifting and horizontal stepping movement of the device. The horizontal movement is however relatively great and thereby high load changes on the handles of a transporting device, which is formed for example as a sack cart, are exerted.

SUMMARY OF THE INVENTION

Accordingly, it is an object of the present invention to provide a transporting device of the above general type, which has a reduced horizontal movement component.

In keeping with these objects and with others which will become apparent hereinafter, one feature of present invention resides, briefly stated, in a transporting device with wheels arranged on a frame and an electric-motor driven stair climbing device, wherein the electric motor of the stair climbing device drives a first eccentric lever, on which corresponding second eccentric levers are rotatably supported, which with their ends are rotatably supported on the supports with supporting feet or rollers arranged on their lower ends, wherein the supports are linearly guided on the device, and transmissions with a transmission ratio of 1:2 are arranged between the first and second eccentric levers.

The transmission with a transmission ratio of 1:2 operates so that during a rotation of the first eccentric lever over 90°, the second eccentric lever performs a rotation over 180°. Thereby with the horizontally oriented first eccentric levers, the second eccentric levers with their ends which are articulately connected to the supports are oriented in direction toward the rotary point of the greater eccentric lever. The supports are located with their pivot points at a distance from the rotary point of the first eccentric lever which is smaller than the length of the lever. With the vertically oriented greater eccentric levers, to the contrary, the second eccentric lever elongates the first lever, whereby as a whole a very high stroke is performed.

The smaller horizontal movement of the supports, when compared with the known devices, makes the substantial reduction of the load changes on the handles of the transporting device. The operation of the device is simplified and becomes considerably more comfortable.

The transmission between the eccentric levers can be formed as a spur gear transmission or as a chain wheel transmission. The supports can be guided by guided rollers in rollers on the device. However, the use of telescopable guides or the like is also possible.

For an optimal step movement of the supports, they can be slightly angled in the region of the articulated connection of the second eccentric levers. Preferably, the wheels are supported on trunnions of the frame, while the stair climbing device is arranged between the wheels on the frame. The stair climbing device therefore does not extend laterally beyond the device.

Further advantages of the inventive device are achieved when the eccentric levers are dimensioned so that in the radial direction they do not extend outwardly beyond the wheels. Thereby collisions of the levers with the edges of the stair steps are reliably prevented.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
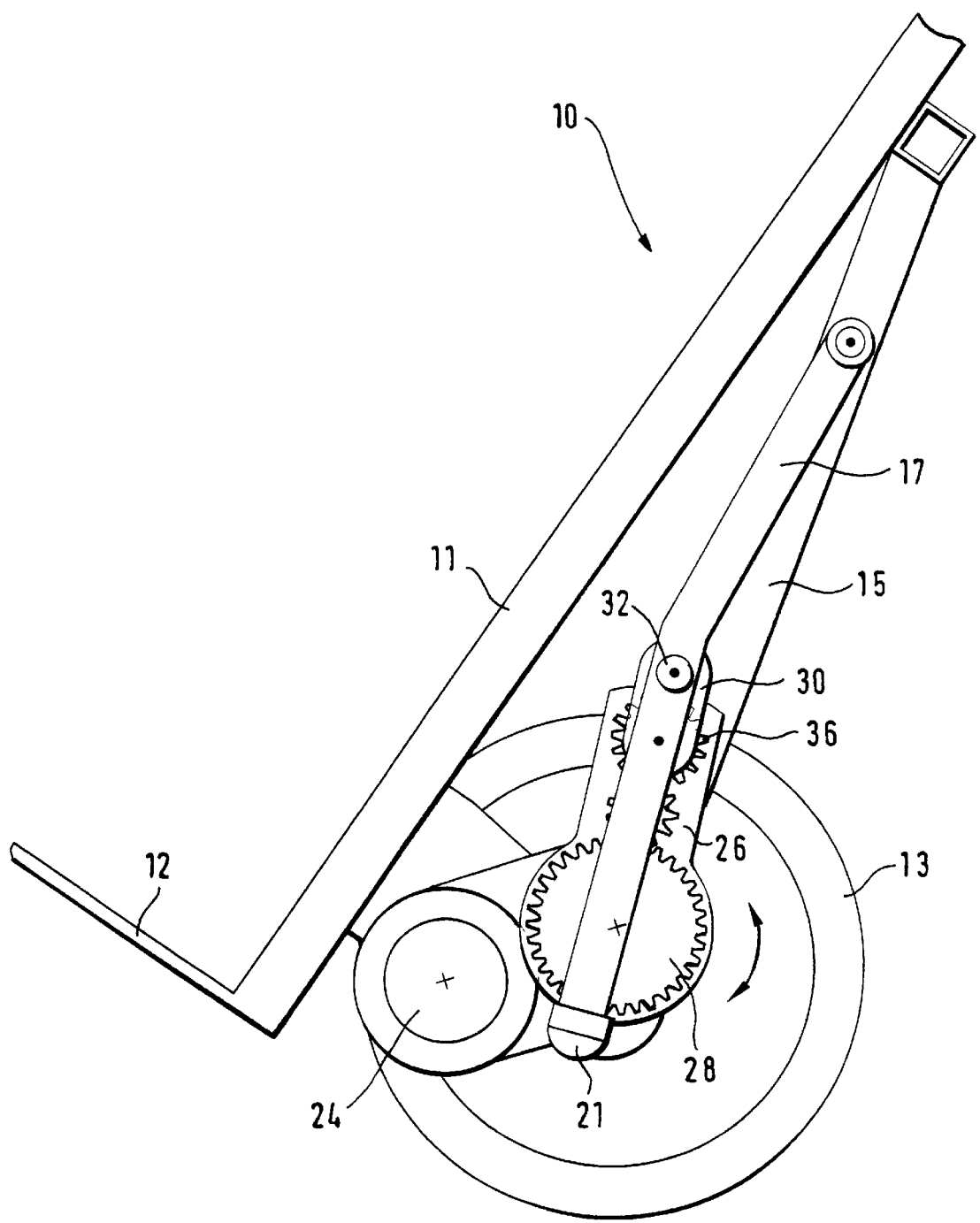
FIG. 1 is a partial side view of a transporting device with a stair climbing device.
Figure 2:
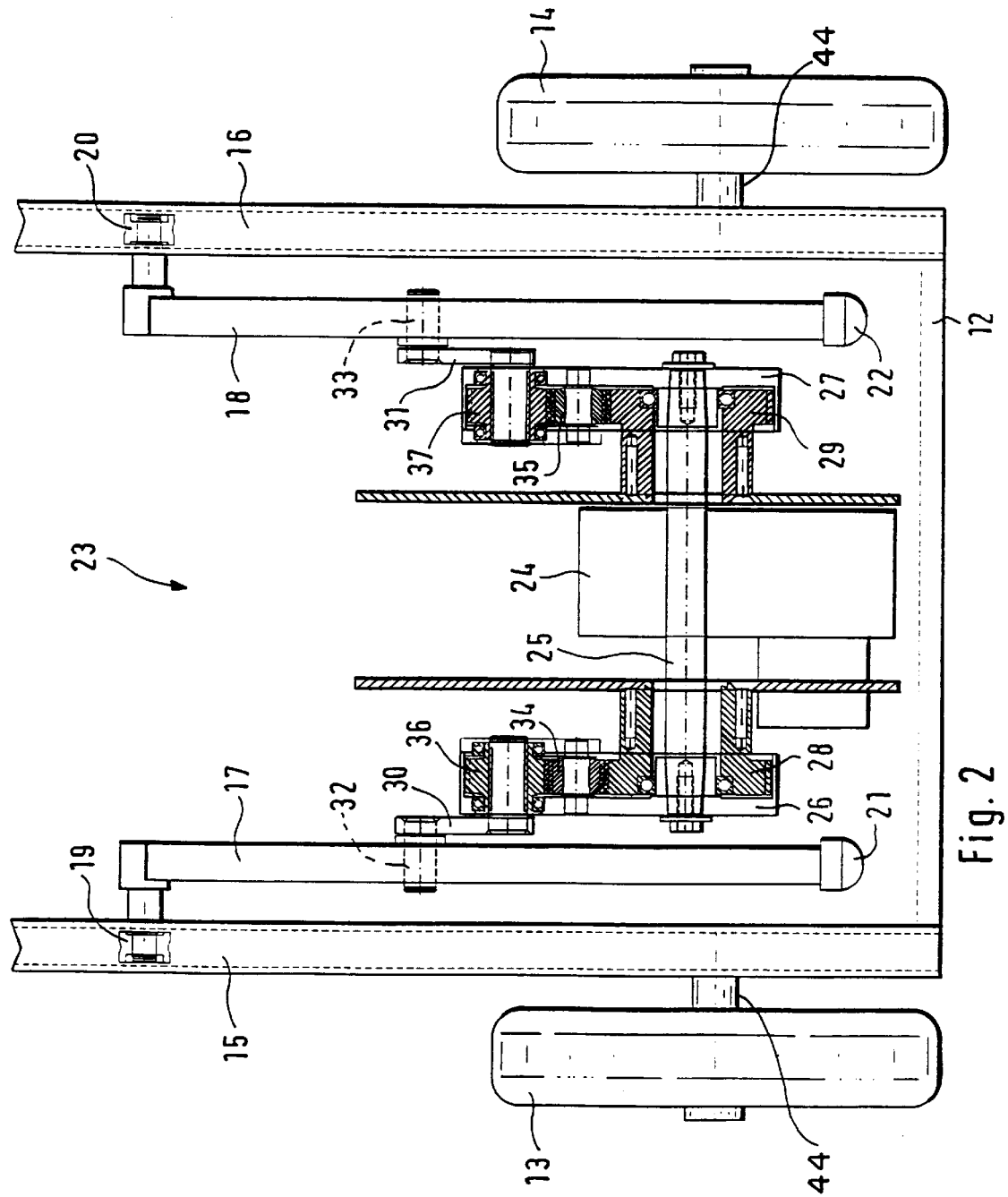
FIG. 2 is a view from behind on the transporting device of FIG. 1.

A transporting device is identified with reference numeral 10 in FIGS. 1 and 2 and has a frame 11 with a bottom plate 12 for receiving of loads and with wheels 13 and 14 which are mounted on trunnions 44 of the frame. The frame 11 is moreover provided with guiding rails 15 and 16 for supports 17 and 18. The supports 17 and 18 slide with guiding rollers 19 and 20 in the rails 15 and 16. At their lower ends the supports 17 and 18 are provided with supporting feet 21 and 22.

As can be seen particularly from FIG. 2, the supports 17 and 18 are parts of a stair climbing unit 23 which is arranged between the rails 15 and 16. The stair climbing unit 23 has a motor 24 with a transmission. The motor 24 drives through a shaft 25 first eccentric levers 26 and 27 as well as immovable spur gears 28 and 29. At the ends of the eccentric levers 26 and 27, two smaller eccentric levers 30 and 31 are rotatably supported. The ends of the eccentric levers 30 and 31 are furthermore supported on the supports 17 and 18 with bearing pins 32 and 33. The drive of the eccentric levers 30 and 31 is performed through further spur gears 34, 35, 36, 37, which together with the spur gears 28, 29 form a transmission with the transmission ratio 1:2.

Figure 3:
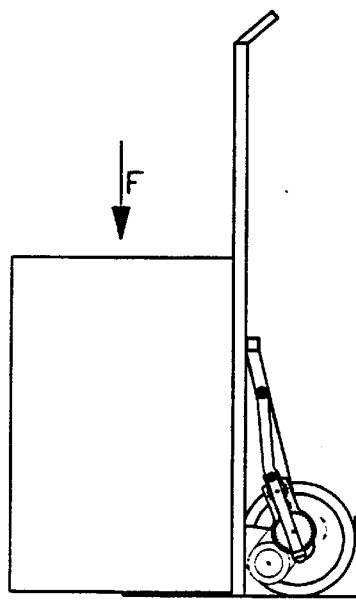
FIGS. 3–10 are side views of the transporting device of FIG. 1 with the load in different positions during climbing a stair step.
Figure 4:
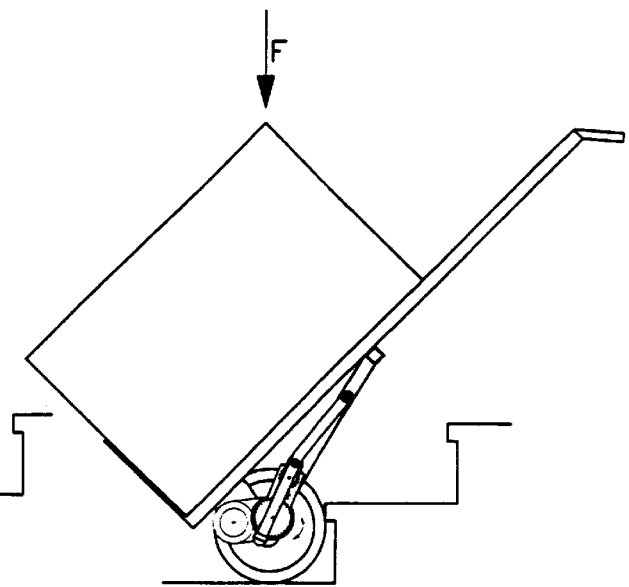
Figure 5:
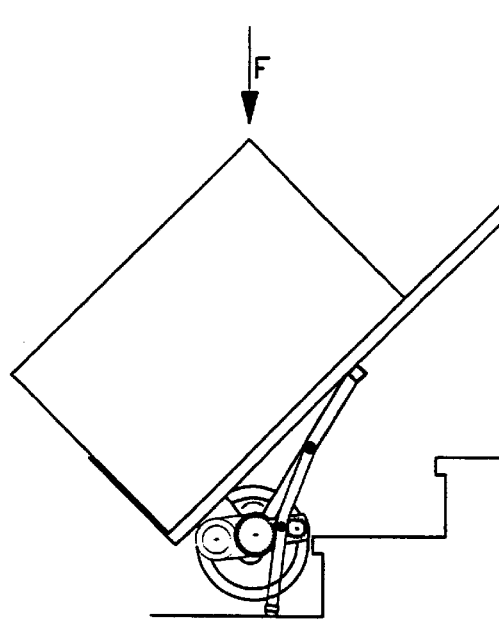
Figure 6:
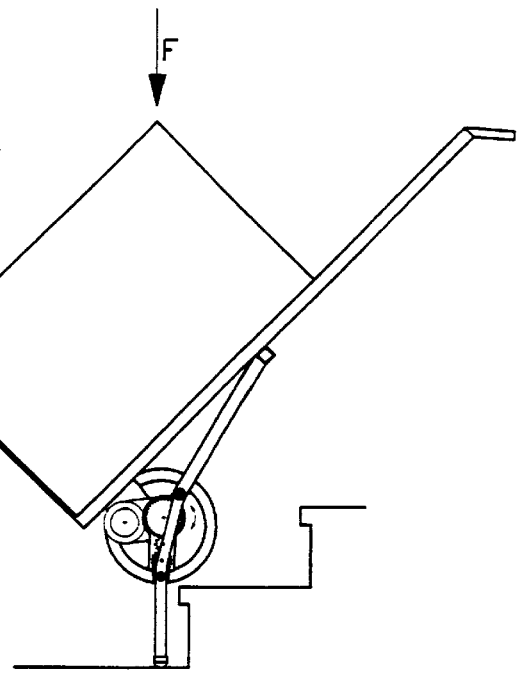
Figures 7, 8:
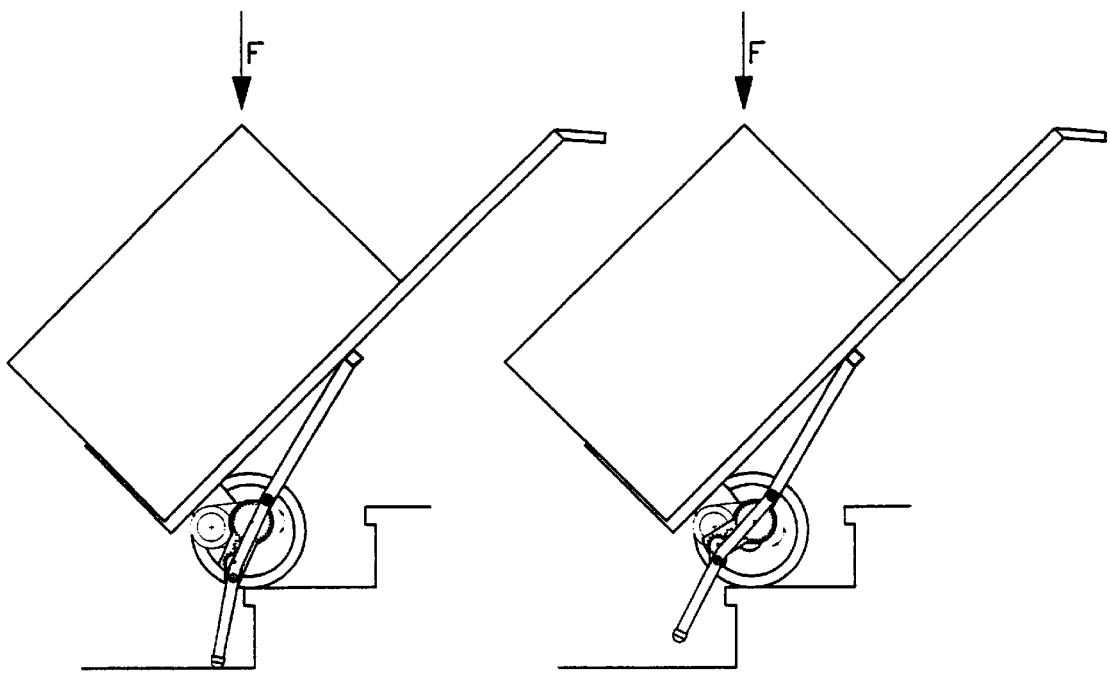
Figures 9, 10:
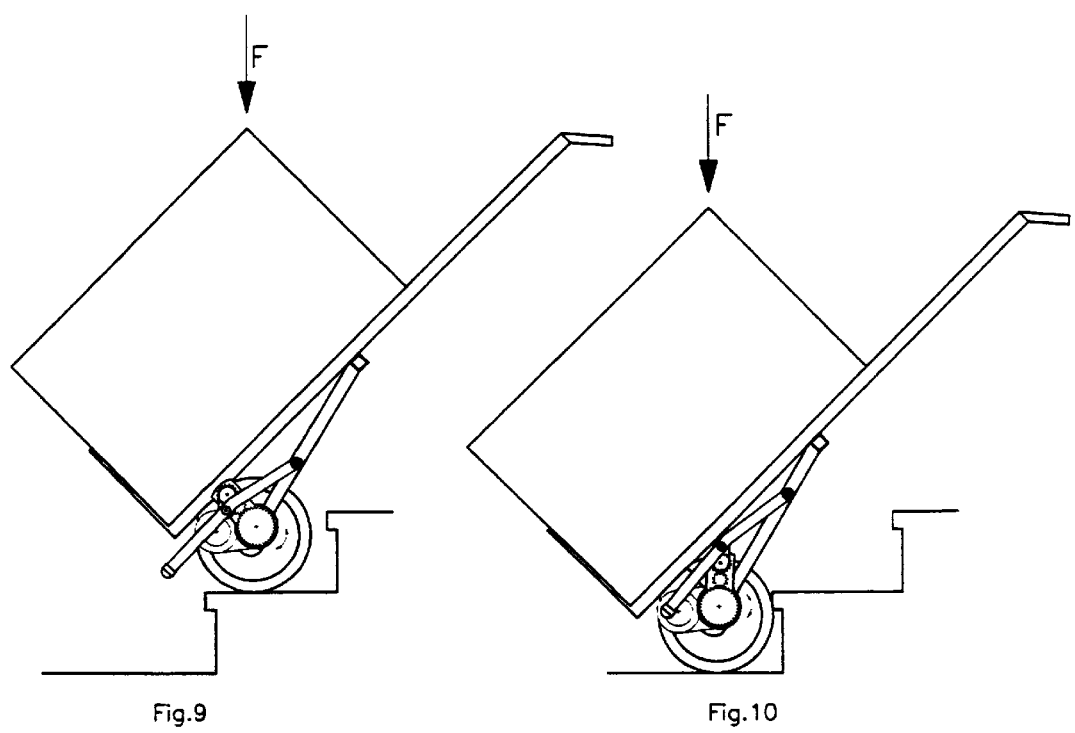

The operation of the stair climbing unit 23 is illustrated in FIGS. 3–10. FIG. 3 shows the stair climbing 10 with a load 40 in an immovable condition, or in other words with the bottom plate 12 which is placed on the ground. The wheel 13 is located directly before the edge of a stair step 41. In accordance with FIG. 4, the transporting device 10 is then inclined and the stair climbing unit is activated, or in other words the motor 24 is turned on. Thereby the first eccentric lever 26 and the second eccentric lever 30 are rotated. Due to the transmission ratio 1:2, the second, smaller eccentric lever 30 performs a 180° rotation while the first eccentric lever 28 performs a rotation over 90°. Thereby the situation shown in FIG. 5 is produced, in which the second eccentric lever 30 faces with its end in direction toward the rotary point 42 of the eccentric lever 26. In this position the supporting foot 21 is lifted from the ground and urges the device 10 upwardly. In FIG. 6 the transporting device 10 reaches its highest position. Both eccentric levers 26 and 30 are oriented downwardly and added in their length. During further turning of the motor, the wheel 13 is moved horizontally over the edge of the stair step 41 and settled as shown in FIG. 7. A further rotation of the motor actuates a lifting of the support 17, so that it can not remain extended on the edge of the stair step 41 when the transporting device 10 is moved in direction toward the next stair step 43 as shown in FIG. 9. FIG. 10 shows the device during reaching of the edge of the next stair step 43. For overcoming this stair step 43, the steps illustrated in FIGS. 4–9 are repeated.

When the device 10 must be moved down the stairs, the direction of the motor is reversed and the movement sequence of FIGS. 3–10 is performed in an opposite order. If desired, the device in accordance with the present invention can be provided with a brake.

It will be understood that each of the elements described above, or two or more together, may also find a useful application in other types of constructions differing from the types described above.

While the invention has been illustrated and described as embodied in the transporting device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

I claim:

1. A transporting device, comprising a frame; wheels arranged on the frame; and a step climbing unit, said step climbing unit including an electric motor, first eccentric levers driven by said electric motor, second eccentric levers rotatably supported on said first eccentric levers said first and second eccentric levers having upper and lower ends, said upper ends of said second eccentric levers are rotatably supported by supports, said supports having lower ends provided with supporting elements and a transmission provided between said second first and second eccentric levers and having a transmission ratio of 1:2.

2. A transporting device as defined in claim 1, wherein said supporting elements provided on said lower ends of said supports are formed as supporting feet.

3. A transporting device as defined in claim 1, wherein said supporting elements provided on said lower ends of said supports are formed as supporting rollers.

4. A transporting device as defined in claim 1, wherein said transmission is a spur gear transmission.

5. A transporting device as defined in claim 1, wherein said transmission is a chain wheel transmission.

6. A transporting device as defined in claim 1, and further comprising rails; and guiding rollers with which said supports are guided in said rails.

7. A transporting device as defined in claim 1, wherein said supports have a region in which they are articulately connected with said second eccentric levers and are slightly angled in said region.

8. A transporting device as defined in claim 1, wherein said wheels are supported on trunnions provided on said frame, said stair climbing unit being arranged between said trunnions.

\* \* \* \* \*